US011651693B2

(12) United States Patent
Gao et al.

(10) Patent No.: US 11,651,693 B2
(45) Date of Patent: *May 16, 2023

(54) PASSENGER WALKING POINTS IN PICK-UP/DROP-OFF ZONES

(71) Applicant: Uber Technologies, Inc., San Francisco, CA (US)

(72) Inventors: Shenglong Gao, San Francisco, CA (US); Konrad Julian Niemiec, Mountain View, CA (US); Jay A. Chen, Fremont, CA (US); Mark Yen, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,934

(22) Filed: Jan. 13, 2022

(65) Prior Publication Data

US 2022/0139227 A1 May 5, 2022

Related U.S. Application Data

(63) Continuation of application No. 16/947,027, filed on Jul. 15, 2020, now Pat. No. 11,244,571.
(Continued)

(51) Int. Cl.
*H04W 4/02* (2018.01)
*G06Q 50/30* (2012.01)
(Continued)

(52) U.S. Cl.
CPC ............. *G08G 1/202* (2013.01); *G06Q 10/02* (2013.01); *G06Q 50/30* (2013.01); *H04W 4/023* (2013.01); *H04W 4/024* (2018.02); *H04W 4/40* (2018.02)

(58) Field of Classification Search
CPC ............. G08G 1/202; G08G 1/005; G08G 1/096827; G08G 1/096844; G06Q 10/02;
(Continued)

(56) References Cited

U.S. PATENT DOCUMENTS

2017/0293925 A1* 10/2017 Marueli ............. G06Q 30/0206
2018/0113456 A1 4/2018 Iagnemma et al.
(Continued)

FOREIGN PATENT DOCUMENTS

WO WO-2019036847 A1 2/2019
WO WO-2019109794 A1 6/2019

OTHER PUBLICATIONS

U.S. Appl. No. 16/947,027, filed Jul. 15, 2020, Passenger Walking Points in Pick-Up/Drop-Off Zones.
(Continued)

*Primary Examiner* — Rafael Pérez-Gutiérrez
*Assistant Examiner* — Frank E. Donado
(74) *Attorney, Agent, or Firm* — Schwegman Lundberg & Woessner, P.A.

(57) ABSTRACT

Systems and methods are provided for finding an available pickup/drop-off zone (PDZ) for an autonomous vehicle (AV) to use to pick up a passenger. A PDZ is selected that is likely to be available and that is within a reasonable walking distance of a passenger. The AV and the passenger are guided to the available PDZ. In selecting the available PDZ, the system balances the human and vehicle routing by taking into account the distance possible PDZs are from the passenger, the likelihood the respective PDZs will be available, the passenger's desire/ability to walk to the respective PDZs (e.g., due to physical limitations, weather, etc.), the driving time of the AV to the respective PDZs, the walking time of the passenger to the respective PDZs, and the like.

20 Claims, 6 Drawing Sheets

Related U.S. Application Data

(60) Provisional application No. 62/881,188, filed on Jul. 31, 2019.

(51) Int. Cl.
  *H04W 4/40* (2018.01)
  *G06Q 10/02* (2012.01)
  *H04W 4/024* (2018.01)
  *G08G 1/00* (2006.01)

(58) Field of Classification Search
  CPC ...... G06Q 50/30; H04W 4/023; H04W 4/024; H04W 4/40
  See application file for complete search history.

(56) References Cited

U.S. PATENT DOCUMENTS

| | | |
|---|---|---|
| 2018/0328748 A1 | 11/2018 | Chachra et al. |
| 2018/0374350 A1* | 12/2018 | Sweeney ............... H04W 4/029 |
| 2019/0108468 A1 | 4/2019 | Nguyen et al. |
| 2019/0353495 A1* | 11/2019 | Dyer .................... G06V 20/588 |
| 2020/0160719 A1 | 5/2020 | Zhang et al. |
| 2020/0302798 A1 | 9/2020 | Zhang |
| 2020/0327516 A1 | 10/2020 | Bai et al. |
| 2020/0356911 A1 | 11/2020 | Sahin et al. |
| 2021/0035450 A1 | 2/2021 | Gao et al. |

OTHER PUBLICATIONS

"U.S. Appl. No. 16/947,027, Final Office Action dated May 14, 2021", 43 pgs.

"U.S. Appl. No. 16/947,027, Non Final Office Action dated Oct. 30, 2020", 34 pgs.

"U.S. Appl. No. 16/947,027, Notice of Allowance dated Sep. 30, 2021", 16 pgs.

"U.S. Appl. No. 16/947,027, Response filed Jan. 29, 2021 to Non Final Office Action dated Oct. 30, 2020", 12 pgs.

"U.S. Appl. No. 16/947,027, Response filed Aug. 16, 2021 to Final Office Action dated May 14, 2021", 12 pgs.

* cited by examiner

PASSENGER WALKING POINTS IN PICK-UP/DROP-OFF ZONES

CLAIM FOR PRIORITY

This application is a continuation of U.S. application Ser. No. 16/947,027, filed Jul. 15, 2020, which claims the benefit of priority of U.S. Application Ser. No. 62/881,188, filed Jul. 31, 2019, each of which is hereby incorporated by reference in their entireties.

TECHNICAL FIELD

The subject matter disclosed herein relates to autonomous vehicles (AVs). In particular, example embodiments may relate to devices, systems, and methods for operating an autonomous vehicle to pickup/drop-off passengers in pickup/drop-off zones and to guide passengers to the pickup/drop-off zones.

BACKGROUND

An autonomous vehicle (AV) (also known as a Self-Driving Vehicle (SDV)) is a vehicle that is capable of sensing its environment and operating some or all of the vehicle's controls based on the sensed environment. An AV includes sensors that capture signals describing the environment surrounding the vehicle and a navigation system that responds to the inputs to navigate the AV along a travel route without human input. In particular, an AV may observe its surrounding environment using a variety of sensors and may attempt to comprehend the environment by performing various processing techniques on data collected by the sensors. Given knowledge of its surrounding environment, the AV may determine an appropriate motion plan relative to a travel route through its surrounding environment.

AVs require specific pick-up/drop-off zones (PDZs) to pick up and drop off passengers. One of the issues that must be resolved for AV fleet managers is identifying safe and efficient PDZs for the pickup/drop-off of passengers. The vehicle needs to be guided to acceptable PDZs close to the passenger's location, and the passengers need to be guided to the PDZ for pickup. Improved optimization techniques are desired to maximize passenger convenience and safety in navigating the passenger and the AV to the most convenient PDZ.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
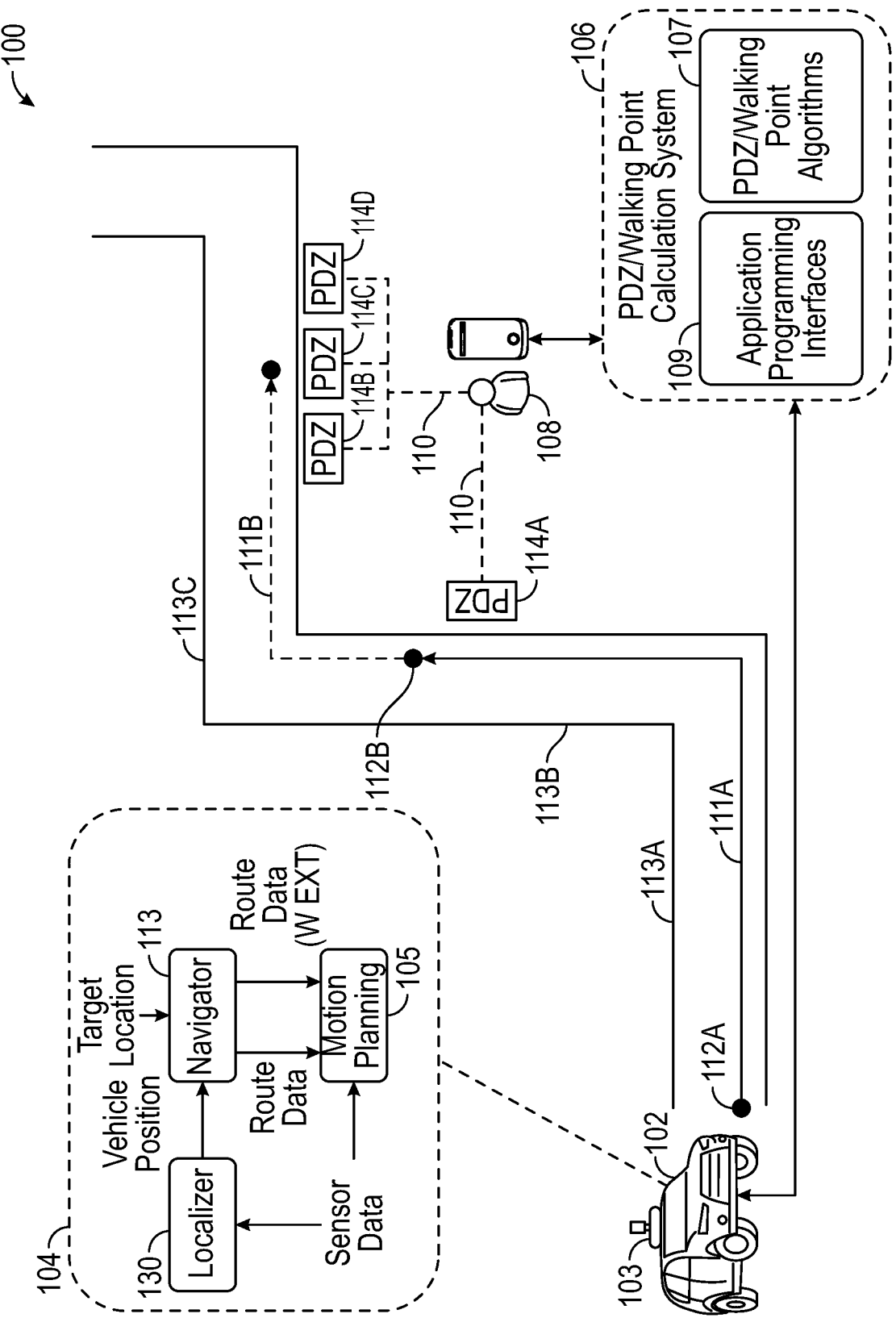
FIG. 1 is a block diagram illustrating an example environment for vehicle routing to recommended pickup/drop-off zones (PDZs), according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In an autonomous or semi-autonomous vehicle (collectively referred to as an AV or a self-driving vehicle (SDV)), a vehicle autonomy system controls one or more of braking, steering, or throttle of the vehicle. A vehicle autonomy system may control an autonomous vehicle along a route to a target location. A route is a path that the autonomous vehicle takes, or plans to take, over one or more roadways. In some examples, the target location of a route is associated with one or more pickup/drop-off zones ("PDZs"). A PDZ is a location where the autonomous vehicle may legally stop, for example, to pick-up or drop-off one or more passengers, pick-up or drop-off one or more pieces of cargo, recharge, download new data, wait for further service request, wait for other autonomous vehicles or otherwise pull over safely. In some examples, the autonomous vehicle may be used to provide a ride service for passengers. In such cases, a PDZ may be a place where the autonomous vehicle may pick-up or drop-off a passenger. In other examples, the autonomous vehicle may be used to provide a delivery service of food or other purchased items. In such cases, a PDZ may be a place where the autonomous vehicle parks to pick up an item or items for delivery or a place where the autonomous vehicle may make a delivery of an item or items to a customer. Non-limiting examples of PDZs include parking spots, driveways, roadway shoulders, and loading docks. It will be appreciated that there are areas that are legal PDZs even though it is not legal to park. All parking spots may be PDZs but not all PDZs may be parking spots. In typical implementations, PDZ availability is controlled on a fleet-level through a fleet registry and not on an individual-vehicle level.

A PDZ may be available for stopping or unavailable for stopping. A PDZ is available for stopping if there is space at the PDZ for the vehicle to stop and pick-up or drop-off a passenger, cargo, or item. For example, a single-vehicle parking spot is available for stopping if no other vehicle is present. A roadway shoulder location is available for stopping if there is an unoccupied portion of the roadway shoulder that is large enough to accommodate the AV. However, in many applications, the vehicle autonomy system does not know if a particular PDZ is available until the PDZ is within the range of the AV's sensors. If a first PDZ is unavailable, the AV may wait until the first PDZ is available or, for example, move on to a next PDZ associated with the route target location. If all PDZs associated with a target location are unavailable, the vehicle autonomy system may generate a new route that passes one or more additional PDZs. In any event, locating an available PDZ is a complex and challenging problem that is further complicated by the timing and availability of the passenger to walk to the PDZ for pickup at the appropriate time.

Aspects of the present disclosure address the issue of finding available PDZs that are within a reasonable walking distance of a passenger and guiding the AV and the passenger to an available PDZ. As will be explained below, the system takes into account the distance prospective PDZs are from the passenger, the likelihood the prospective PDZs will be available, the passenger's desire/ability to walk to the prospective PDZs (e.g., due to physical limitations, weather, etc.), the driving time of the AV to the prospective PDZs, the walking time of the passenger to the prospective PDZs, and the like.

With reference to FIG. 1, an example environment 100 for vehicle routing based on PDZ availability and passenger walking points is illustrated, according to some embodiments. The environment 100 includes a vehicle 102. The vehicle 102 may be a passenger vehicle such as a car, a truck, a bus, or other similar vehicle. The vehicle 102 may also be a delivery vehicle, such as a van, a truck, a tractor trailer, and so forth. In sample embodiments, the vehicle 102 is an SDV or AV that includes a vehicle autonomy system configured to operate some or all of the controls of the vehicle (e.g., acceleration, braking, steering). As an example, as shown, the vehicle 102 includes a vehicle autonomy system 104.

In some examples, the vehicle autonomy system 104 is operable in different modes, where the vehicle autonomy system 104 has differing levels of control over the vehicle 102 in different modes. In some examples, the vehicle autonomy system 104 is operable in a full autonomous mode in which the vehicle autonomy system 104 has responsibility for all or most of the controls of the vehicle 102. In addition to or instead of the full autonomous mode, the vehicle autonomy system 104, in some examples, is operable in a semi-autonomous mode in which a human user or driver is responsible for some or all of the control of the vehicle 102. Additional details of an example vehicle autonomy system are provided with respect to FIG. 3.

The vehicle 102 may have one or more remote-detection sensors 103 that receive return signals from the environment 100. Return signals may be reflected from objects in the environment 100, such as the ground, buildings, trees, and so forth. The remote-detection sensors 103 may include one or more active sensors, such as LIDAR, RADAR, and/or SONAR, that emit sound or electromagnetic radiation in the form of light or radio waves to generate return signals. The remote-detection sensors 103 may also include one or more passive sensors, such as cameras or other imaging sensors, proximity sensors, and so forth, that receive return signals that originated from other sources of sound or electromagnetic radiation. Information about the environment 100 is extracted from the return signals. In some examples, the remote-detection sensors 103 include one or more passive sensors that receive reflected ambient light or other radiation, such as a set of monoscopic or stereoscopic cameras. Remote-detection sensors 103 provide remote sensor data that describes the environment 100. The vehicles 102 may also include other types of sensors, for example, as described in more detail with respect to FIG. 3.

As an example of the operation of the vehicle autonomy system 104, the vehicle autonomy system 104 may generate a route 111A for the vehicle 102 extending from a starting location 112A to a target location 112B. The starting location 112A may be a current vehicle position and/or a position to which the vehicle 102 will travel to begin the route 111A. The route 111A describes a path of travel over one or more roadways including, for example, turns from one roadway to another, exits on or off a roadway, and so forth. In some examples, the route 111A also specifies lanes of travel, for example, on roadways having more than one lane of travel. In this example, the initial route 111A extends along roadways 113A, 113B, and 113C although, in various examples, routes extend over more or fewer roadways.

The environment 100 also includes a PDZ/Walking Point Calculation system 106 that implements PDZ/Walking Point Algorithms 107 to calculate to which PDZ 114A, 114B, 114C, 114D, etc. to guide the vehicle 102 and the passenger 108 for pickup. In sample embodiments, the calculations factor in the likelihood that a PDZ associated with a location will be available at a particular time by, for example, attaching a weighting to each PDZ 114 based on the probability that the PDZ will be available. Such a process is described, for example, in U.S. patent application Ser. No. 16/514,933, filed Jul. 17, 2019, the disclosure of which is incorporated herein by reference. As described therein, a probabilistic model of PDZ availability may be trained using historical data to compute a probabilistic estimation of PDZ availability based on identified features (e.g., patterns) in the historical data. The historical data may include any one or more of user-generated information (e.g., user generated reports of an occupied or unoccupied PDZ), vehicle driving logs, vehicular sensor logs (e.g., comprising image sensor data, Radar data, Lidar data, etc.), traffic information, public transit schedules, parking restrictions, global position system (GPS) data from one or more vehicles (e.g., known location of one or more stopped vehicles), and parking spot occupancy data obtained from parking meters or other parking sensors. The training of the probabilistic estimation may include applying one of many known machine learning algorithms to the historical data. The probabilistic model may be routinely refined, in an offline process, based on new information that provides an indication of PDZ availability. For example, the probabilistic model may be updated in real-time or near real-time as the new information is generated or obtained, or the probabilistic model may be periodically updated (e.g., nightly) using batches of new information. A network-based system (e.g., comprising one or more server computers) may host the probabilistic model and expose one or more application programming interfaces (APIs) that facilitate interaction with the probabilistic model by internal and external systems and services such as the system and service described herein. The API also may be utilized by a vehicle autonomy system in route planning for an AV. For example, the vehicle autonomy system 104 may utilize the likelihood of PDZ availability provided by the probabilistic model in generating or refining a route for the AV 102.

The PDZ/Walking Point Calculation system 106 comprises one or more computer server systems configured to exchange data, over a wireless network, with the vehicle autonomy system 104 of the vehicles 102. The data exchanged between the PDZ/Walking Point Calculation system 106 and the vehicle autonomy system 104 may include requests for PDZ availability in the vicinity of the passenger 108, responses to PDZ availability requests, vehicle position, and the like. To this end, the PDZ/Walking Point Calculation system 106 exposes various APIs 109 to the vehicle autonomy system 104.

As an example, the PDZ/Walking Point Calculation system 106 may expose a first API that allows the vehicle autonomy system 104 and other network-based systems and services (both first or third party) to submit information to be used in determining the availability of the PDZs 114 in the passenger's vicinity, driving time of the vehicle 102 to each PDZ 114, and the like. This information may include one or more indicia of PDZ availability such as sensor data, user generated reports of PDZ availability, or machine generated reports of PDZ availability.

As another example, the PDZ/Walking Point Calculation system 106 may expose a second API that allows the vehicle autonomy system 104 and other network-based systems and services (first or third party) to submit requests for PDZ locations 114 and availability estimations for the PDZs 114 within acceptable walking distance of the passenger 108. For example, the vehicular autonomy system 104 may submit a request for an availability estimation for PDZs 114 within a specified walking distance from the location of the passenger 108. The request may include an estimated time of arrival of the vehicle 102 at each PDZ 114 within the specified walking distance from the location of the passenger 108 along the (e.g., determined based on the route 111A).

As shown in FIG. 1, a specified pickup location or target location 112B may be associated with PDZs 114A, 114B, 114C, and 114D that are within an acceptable walking distance from the target location 112B and/or within acceptable walking distance from the current location of passenger 108. For example, where the target location 112B of the vehicle 102 is at or near a city block, the PDZs 114A, 114B, 114C, and 114D may be a shoulder or curb-side area on the city block where the vehicle 102 may pull-over. The PDZs 114A, 114B, 114C, and 114D may be associated with the target location 112B of the vehicle 102 based on being within the acceptable walking distance (maximum walking distance) of the target location 112B and/or within the acceptable walking distance from the current location of passenger 108. In some examples, the PDZs 114A, 114B, 114C, and 114D are weighted ("prioritized") based on the direction of travel of the vehicle 102. For example, in the United States, where traffic travels on the right-hand side of the roadway, PDZs on the right-hand shoulder of the roadway relative to the vehicle 102 are associated with a target location, such as 112B, while PDZs on the left-hand shoulder of the roadway may not be, as it may not be desirable for the vehicle 102 to cross traffic to reach the left-hand shoulder of the roadway. Also, the weightings of the PDZs may take into account the relative arrive time of the vehicle 102 to each PDZ 114 along its route 111A versus the arrival time of the walking passenger 108 at the same PDZ 114 along an anticipated walking route 110.

Upon receiving a request from the vehicle 102, the PDZ/Walking Point Calculation system 106 calculates the recommended PDZ 114 for the vehicle 102 based on the estimated time of arrival of the vehicle 102 and the passenger 108 at the recommended PDZ 114 as well as the likely availability of the PDZ 114 at the estimated time of arrival. In estimating the likelihood that a PDZ 114 will be available at the estimated time of arrival, the PDZ/Walking Point Calculation system 106 may implement the afore-mentioned probabilistic model to individually estimate a likelihood that each of the PDZs 114A, 114B, 114C, and 114D will be available for picking up the passenger 108 at the estimated time of arrival of the vehicle 102. The PDZ/Walking Point Calculation system 106 generates a response to the request based on the estimate of availability of the PDZs 114A, 114B, 114C, and 114D and transmits the response to the vehicular autonomy system 104 in response to the request. The response may include a value indicating a likelihood that the recommended PDZ 114 will be available at the estimated time of arrival of the vehicle 102 and the passenger 108 and may further include the individual estimates of availability for the respective PDZs 114A, 114B, 114C, and 114D.

In sample embodiments, the response may include a target PDZ 114 selected from the PDZs 114A, 114B, 114C, and 114D. For example, the 114A, 114B, 114C, and 114D may select one of the PDZs 114A, 114B, 114C, and 114D as the target PDZ 114 based on the individual likelihoods of each PDZ being available at the estimated time of arrival of the vehicle 102 and the passenger 108. In some instances, the PDZ/Walking Point Calculation system 106 may select the PDZ 114 having the highest likelihood of availability while in other instances the system may select a PDZ 114 with a lower likelihood of availability if, for example, the PDZ 114 is significantly closer to the current location of the passenger 108. For example, although the PDZ 114A may have the highest likelihood of being available at the estimated time of arrival of the vehicle 102, the PDZ/Walking Point Calculation system 106 may select PDZ 114C as the target PDZ because it is significantly closer to the current location of the passenger 108 and it is a rainy day.

The vehicle autonomy system 104 controls the vehicle 102 along the route 111A towards the target location 112B. For example, the vehicle autonomy system 104 controls one or more of the steering, braking, and acceleration of the vehicle 102 to direct the vehicle 102 along the roadway according to the route 111A. Upon receiving the response from PDZ/Walking Point Calculation system 106, the vehicle autonomy system 104 may refine the route 111A or generate a new route based on the PDZ recommendation. In a first example, based on the response identifying the PDZ 114C as the target PDZ 114, the vehicle autonomy system 104 may generate a route extension 111B that extends from the target location 112B to the PDZ 114C. In this example, the route extension 111B traverses the roadway 113B and roadway 113C with a right turn from the roadway 113B to the roadway 113C. In a second example, despite the response identifying the PDZ 114C as the target PDZ 114, the vehicle autonomy system 104 may instead select PDZ 114D as the target PDZ 114 and generate a route extension 111B that extends from the target location 112B to the PDZ 114D. In either example, if the vehicle autonomy system 104 is assigned to the target location 112B for the purpose of picking up a passenger, the passenger 108 may be notified of the target PDZ 114 to which the vehicle 102 is traveling and may further be provided a walking route or directions from the target location 112B to the target PDZ 114 or a walking point that may be at or near the target PDZ 114 or from the current location of the passenger 108 to the target PDZ 114 or the walking point. As described herein, the walking point may be a waiting point (e.g., a location under cover) adjacent the PDZ 114.

In some examples, the vehicle autonomy system 104 may separate the process of stopping the vehicle 102 at a PDZ 114 from generating routes and/or route extensions. For example, the vehicle autonomy system 104 of FIG. 1 may include a localizer system 130, a navigator system 113, and a motion planning system 105. The navigator system 113 is configured to generate routes, including route extensions. The motion planning system 105 is configured to determine whether PDZs 114 associated with a target location 112B are available and cause the vehicle 102 to stop at the recommended PDZ 114. The navigator system 113 continues to generate route extensions, as described herein, until the motion planning system 105 causes the vehicle 102 to stop at a recommended PDZ 114.

The localizer system 130 may receive sensor data from remote detection sensors 103 (and/or other sensors) to generate a vehicle position. In some examples, the localizer system 130 generates a vehicle pose including the vehicle position and vehicle attitude, described in more detail herein. The vehicle position generated by the localizer system 130 is provided to the navigator system 113. The navigator system 113 also receives and/or accesses target location data describing the vehicle's target location. The target location data may be received from the passenger 108, from PDZ/Walking Point Calculation system 106, from another component of the vehicle autonomy system 104, and/or from another suitable source. In some embodiments, the navigator system 113 uses the target location data and the vehicle position to generate route data describing the route 111A and route extension 111B. In some embodiments, at least a portion of the route data (e.g., the portion describing the route extension 111B) may be provided to the PDZ/Walking Point Calculation system 106 so that it may estimate the availability of prospective PDZs 114 within a specified walking distance from the location of the passenger 108. The route data may include an indication of the route 111A and of each available PDZ 114 within the acceptable walking distance from the passenger 108. The route data is provided to the motion planning system 105 and may be provided to the PDZ/Walking Point Calculation system 106 to, for example, enable the PDZ/Walking Point Calculation system 106 to prioritize PDZs along the expected route of the AV 102.

The motion planning system 105 uses the route data to control the vehicle 102 along the route 111A and route extension 111B. For example, the motion planning system 105 sends control commands to the throttle, steering, brakes, and/or other controls of the vehicle 102 to cause the vehicle 102 to traverse the route 111A. The motion planning system 105 is programmed to stop the vehicle 102 if the vehicle 102 approaches a recommended PDZ 114. The navigator system 113 continues to generate route data describing routes, for example, until the motion planning system 105 successfully stops the vehicle 102 at a recommended PDZ 114.

In sample embodiments, PDZ/Walking Point Calculation system 106 optimizes the passenger experience by recommending a PDZ that the passenger may walk to while waiting for the vehicle 102 to arrive, thereby minimizing wasted idle time. For example, if a passenger is waiting for a ride, it is actually faster, on average, for the passenger to walk to the spot that is of least walk-time to the final pickup spot, before the vehicle 102 determines what that spot is. Then, once the vehicle 102 confirms a location, the passenger may walk a second time. This feature is illustrated in FIG. 2.

Figure 2:
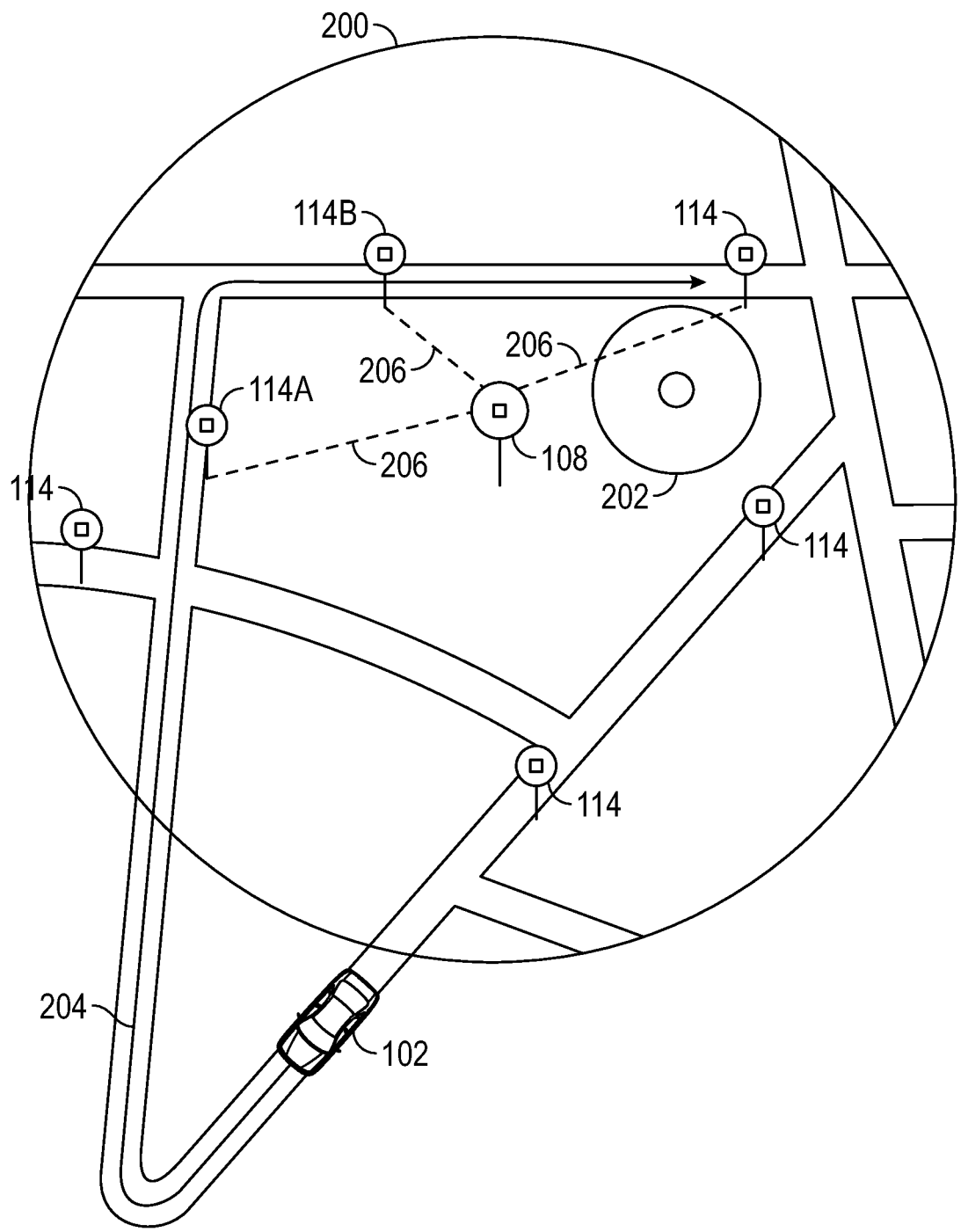
FIG. 2 is a map illustrating a circle around the passenger indicating the distance the passenger is willing (or may be expected) to walk to a PDZ and that is used to identify PDZs that are acceptably close to the passenger.

FIG. 2 is a map illustrating a circle 200 around the passenger 108 indicating the distance the passenger is willing (or may be expected) to walk to a PDZ 114. In this example, the passenger 108 making a request would not be limited to PDZs grouped based on their proximity to each other. Instead the PDZs are provided in this example based on their proximity to the passenger 108 and/or proximity to the pickup location 202 requested by the passenger along the route 204 of the vehicle 102. Also, the PDZs 114 may be provided and prioritized based on the intended route of the vehicle 102. In sample embodiments, the PDZs 114 are independent of each other and are not grouped together as predetermined sets. Rather, at match-time, a cluster of PDZs 114 will be generated based on factors such as vehicle ETA to the PDZ, passenger ETA to the PDZ, current PDZ availability, historical PDZ availability, and vehicle capabilities. The PDZ/Walking Point Calculation system 106 would dynamically generate the most optimal set of PDZs 114 for a given trip relative to the current location of passenger 108 and/or the pickup location 202 requested by the passenger. The PDZs 114 would be weighted based on their predicted availabilities. Thus, as PDZ predicted to have a 90% chance of availability would be weighted more heavily than a PDZ with a 5% chance of availability. Also, PDZs 114 that are along the route 204 of the vehicle 102 on the way to the pickup location 202 requested by the user (e.g., PDZs 114A and 114B) may be given priority (i.e., weighted more heavily) so long as the walking route 206 is predicted to enable the customer to get to the PDZ 114 without rushing.

Figure 3:
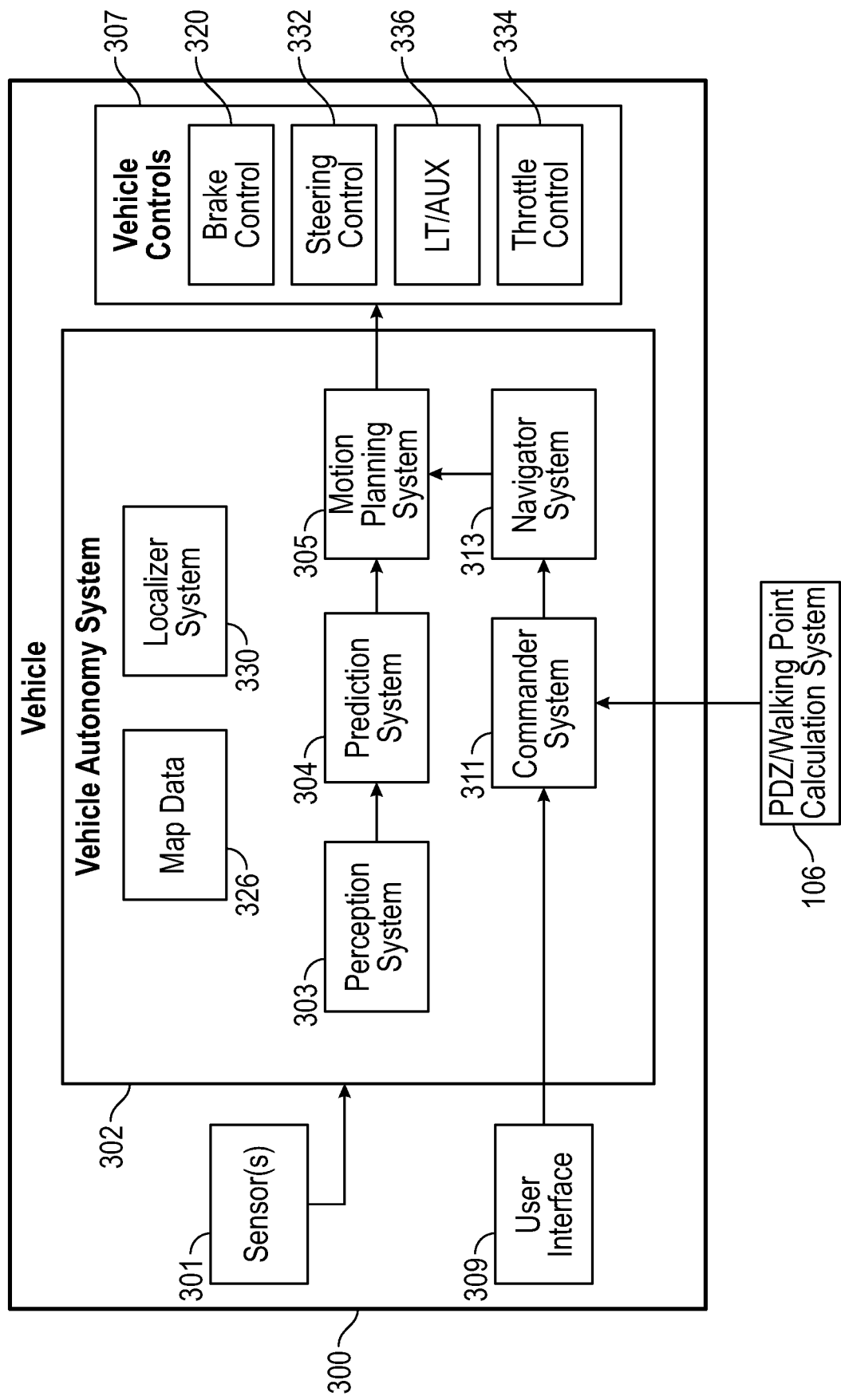
FIG. 3 is a block diagram depicting an example vehicle, according to some embodiments.

FIG. 3 is a block diagram depicting an example vehicle 300, according to some embodiments. To avoid obscuring the inventive subject matter with unnecessary detail, various functional components that are not germane to conveying an understanding of the inventive subject matter have been omitted from FIG. 3. However, a skilled artisan will readily recognize that various additional functional components may be included as part of the vehicle 300 to facilitate additional functionality that is not specifically described herein.

The vehicle 300 includes one or more sensors 301, a vehicle autonomy system 302, and one or more vehicle controls 307. The vehicle 300 may be an autonomous vehicle, as described herein. In sample embodiments, the vehicle autonomy system 302 includes a commander system 311, a navigator system 313, a perception system 303, a prediction system 304, a motion planning system 305, and a localizer system 330 that cooperate to perceive the surrounding environment of the vehicle 300 and determine a motion plan for controlling the motion of the vehicle 300 accordingly.

The vehicle autonomy system 302 is engaged to control the vehicle 300 or to assist in controlling the vehicle 300. In particular, the vehicle autonomy system 302 receives sensor data from the one or more sensors 301, attempts to comprehend the environment surrounding the vehicle 300 by performing various processing techniques on data collected by the sensors 301, and generates an appropriate route through the environment. The vehicle autonomy system 302 sends commands to control the one or more vehicle controls 307 to operate the vehicle 300 according to the route.

Various portions of the vehicle autonomy system 302 receive sensor data from the one or more sensors 301. For example, the sensors 301 may include remote-detection sensors as well as motion sensors such as inertial measurement units (IMUs), one or more encoders, or one or more odometers. The sensor data may include information that describes the location of objects within the surrounding environment of the vehicle 300, information that describes the motion of the vehicle 300, and so forth.

The sensors 301 may also include one or more remote-detection sensors or sensor systems, such as a LIDAR, a RADAR, one or more cameras, and so forth. As one example, a LIDAR system of the one or more sensors 301 generates sensor data (e.g., remote-detection sensor data) that includes the location (e.g., in three-dimensional space relative to the LIDAR system) of a number of points that correspond to objects that have reflected a ranging laser. For example, the LIDAR system may measure distances by measuring the Time of Flight (TOF) that it takes a short laser pulse to travel from the sensor to an object and back, calculating the distance from the known speed of light.

As another example, a RADAR system of the one or more sensors 301 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system may reflect off an object and return to a receiver of the RADAR system, giving information about the object's location and speed. Thus, a RADAR system may provide useful information about the current speed of an object.

As yet another example, one or more cameras of the one or more sensors 301 may generate sensor data (e.g., remote sensor data) including still or moving images. Various processing techniques (e.g., range imaging techniques such as, for example, structure from motion, structured light, stereo triangulation, and/or other techniques) may be performed to identify the location (e.g., in three-dimensional space relative to the one or more cameras) of a number of points that correspond to objects that are depicted in an image or images captured by the one or more cameras. Other sensor systems may identify the location of points that correspond to objects as well.

As another example, the one or more sensors 301 may include a positioning system. The positioning system determines a current position of the vehicle 300. The positioning system may be any device or circuitry for analyzing the position of the vehicle 300. For example, the positioning system may determine a position by using one or more of inertial sensors, a satellite positioning system such as a global positioning system (GPS), based on an Internet Protocol (IP) address, by using triangulation and/or proximity to network access points or other network components (e.g., cellular towers, Wi-Fi access points), and/or other suitable techniques. The position of the vehicle 300 may be used by various systems of the vehicle autonomy system 302.

Thus, the one or more sensors 301 may be used to collect sensor data that includes information that describes the location (e.g., in three-dimensional space relative to the vehicle 300) of points that correspond to objects within the surrounding environment of the vehicle 300. In some implementations, the sensors 301 may be positioned at various different locations on the vehicle 300. As an example, in some implementations, one or more cameras and/or LIDAR sensors may be located in a pod or other structure that is mounted on a roof of the vehicle 300 while one or more RADAR sensors may be located in or behind the front and/or rear bumper(s) or body panel(s) of the vehicle 300. As another example, camera(s) may be located at the front or rear bumper(s) of the vehicle 300. Other locations may be used as well.

The localizer system 330 receives some or all of the sensor data from sensors 301 and generates vehicle poses for the vehicle 300. A vehicle pose describes the position and attitude of the vehicle 300. The vehicle pose (or portions thereof) may be used by various other components of the vehicle autonomy system 302 including, for example, the perception system 303, the prediction system 304, the motion planning system 305, and the navigator system 313.

The position of the vehicle 300 is a point in a three-dimensional space. In some examples, the position is described by values for a set of Cartesian coordinates, although any other suitable coordinate system may be used. The attitude of the vehicle 300 generally describes the way in which the vehicle 300 is oriented at its position. In some examples, attitude is described by a yaw about the vertical axis, a pitch about a first horizontal axis, and a roll about a second horizontal axis. In some examples, the localizer system 330 generates vehicle poses periodically (e.g., every second, every half second). The localizer system 330 appends time stamps to vehicle poses, where the time stamp for a pose indicates the point in time that is described by the pose. The localizer system 330 generates vehicle poses by comparing sensor data (e.g., remote sensor data) to map data 326 describing the surrounding environment of the vehicle 300.

In some examples, the localizer system 330 includes one or more pose estimators and a pose filter. Pose estimators generate pose estimates by comparing remote-sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 330 generates vehicle poses. Accordingly, the pose filter generates some vehicle poses by extrapolating from a previous pose estimate utilizing motion sensor data.

Vehicle poses and/or vehicle positions generated by the localizer system 330 may be provided to various other components of the vehicle autonomy system 302. For example, the commander system 311 may utilize a vehicle position to determine whether to respond to a call from a dispatch system.

The commander system 311 determines a set of one or more target locations that are used for routing the vehicle 300. The target locations may be determined based on user input received via a user interface 309 of the vehicle 300. The user interface 309 may include and/or use any suitable input/output device or devices. In some examples, the commander system 311 determines the one or more target locations considering data received from PDZ/Walking Point Calculation system 106.

PDZ/Walking Point Calculation system 106 may be programmed to provide information to multiple vehicles, for example, as part of a fleet of vehicles for moving passengers and/or cargo. Data from PDZ/Walking Point Calculation system 106 may be provided to each vehicle via a wireless network, for example. As will be discussed in further detail below, PDZ/Walking Point Calculation system 106 is responsible for providing one or more recommended PDZs to which the vehicle 300 is routed and the walking passenger 108 is routed for pickup.

The navigator system 313 receives one or more target locations from the commander system 311 or user interface 309 along with map data 326. Map data 326, for example, may provide detailed information about the surrounding environment of the vehicle 300. Map data 326 may provide information regarding identity and location of different roadways and segments of roadways (e.g., lane segments). A roadway is a place where the vehicle 300 may drive and may include, for example, a road, a street, a highway, a lane, a parking lot, or a driveway. From the one or more target locations and the map data 326, the navigator system 313 generates route data describing a route for the vehicle to take to arrive at the one or more target locations.

In some implementations, the navigator system 313 determines route data based on applying one or more cost functions and/or reward functions for each of one or more candidate routes for the vehicle 300. For example, a cost function may describe a cost (e.g., a time of travel) of adhering to a particular candidate route while a reward function may describe a reward for adhering to a particular candidate route. For example, the reward may be of an opposite sign to that of cost. Route data is provided to the motion planning system 305, which commands the vehicle controls 307 to implement the route or route extension, as described herein.

The perception system 303 detects objects in the surrounding environment of the vehicle 300 based on sensor data, map data 326, and/or vehicle poses provided by the localizer system 330. For example, map data 326 used by the perception system 303 may describe roadways and segments thereof and may also describe: buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 302 in comprehending and perceiving its surrounding environment and its relationship thereto.

In some examples, the perception system 303 determines state data for one or more of the objects in the surrounding environment of the vehicle 300. State data describes a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 300; minimum path to interaction with the vehicle 300; minimum time duration to interaction with the vehicle 300; and/or other state information.

In some implementations, the perception system 303 may determine state data for each object over a number of iterations. In particular, the perception system 303 updates the state data for each object at each iteration. Thus, the perception system 303 detects and tracks objects, such as vehicles, that are proximate to the vehicle 300 over time.

The prediction system 304 is configured to predict one or more future positions for an object or objects in the environment surrounding the vehicle 300 (e.g., an object or objects detected by the perception system 303). The prediction system 304 generates prediction data associated with one or more of the objects detected by the perception system 303. In some examples, the prediction system 304 generates prediction data describing each of the respective objects detected by the prediction system 304.

Prediction data for an object may be indicative of one or more predicted future locations of the object. For example, the prediction system 304 may predict where the object will be located within the next 5 seconds, 30 seconds, 200 seconds, and so forth. Prediction data for an object may indicate a predicted trajectory (e.g., predicted path) for the object within the surrounding environment of the vehicle 300. For example, the predicted trajectory (e.g., path) may indicate a path along which the respective object is predicted to travel over time (and/or the speed at which the object is predicted to travel along the predicted path). The prediction system 304 generates prediction data for an object, for example, based on state data generated by the perception system 303. In some examples, the prediction system 304 also considers one or more vehicle poses generated by the localizer system 330 and/or map data 326.

In some examples, the prediction system 304 uses state data indicative of an object type or classification to predict a trajectory for the object. As an example, the prediction system 304 may use state data provided by the perception system 303 to determine that a particular object (e.g., an object classified as a vehicle) approaching an intersection and maneuvering into a left-turn lane intends to turn left. In such a situation, the prediction system 304 predicts a trajectory (e.g., path) corresponding to a left turn for the vehicle 300 such that the vehicle 300 turns left at the intersection. Similarly, the prediction system 304 determines predicted trajectories for other objects, such as bicycles, pedestrians, parked vehicles, and so forth. The prediction system 304 provides the predicted trajectories associated with the object(s) to the motion planning system 305.

In some implementations, the prediction system 304 is a goal-oriented prediction system 304 that generates one or more potential goals, selects one or more of the most likely potential goals, and develops one or more trajectories by which the object may achieve the one or more selected goals. For example, the prediction system 304 may include a scenario generation system that generates and/or scores the one or more goals for an object and a scenario development system that determines the one or more trajectories by which the object may achieve the goals. In some implementations, the prediction system 304 may include a machine-learned goal-scoring model, a machine-learned trajectory development model, and/or other machine-learned models.

The motion planning system 305 commands the vehicle controls based at least in part on the predicted trajectories associated with the objects within the surrounding environment of the vehicle 300, the state data for the objects provided by the perception system 303, vehicle poses provided by the localizer system 330, map data 326, and route data provided by the navigator system 313. Stated differently, given information about the current locations of objects and/or predicted trajectories of objects within the surrounding environment of the vehicle 300, the motion planning system 305 determines control commands for the vehicle 300 that best navigate the vehicle 300 along the route or route extension relative to the objects at such locations and their predicted trajectories on acceptable roadways.

In some implementations, the motion planning system 305 may also evaluate one or more cost functions and/or one or more reward functions for each of one or more candidate control commands or sets of control commands for the vehicle 300. Thus, given information about the current locations and/or predicted future locations/trajectories of objects, the motion planning system 305 may determine a total cost (e.g., a sum of the cost(s) and/or reward(s) provided by the cost function(s) and/or reward function(s)) of adhering to a particular candidate control command or set of control commands. The motion planning system 305 may select or determine a control command or set of control commands for the vehicle 300 based at least in part on the cost function(s) and the reward function(s). For example, the motion plan that minimizes the total cost may be selected or otherwise determined.

In some implementations, the motion planning system 305 may be configured to iteratively update the route for the vehicle 300 as new sensor data is obtained from one or more sensors 301. For example, as new sensor data is obtained from one or more sensors 301, the sensor data may be analyzed by the perception system 303, the prediction system 304, and the motion planning system 305 to determine the motion plan.

The motion planning system 305 may provide control commands to one or more vehicle controls 307. For example, the one or more vehicle controls 307 may include throttle systems, brake systems, steering systems, and other control systems, each of which may include various vehicle controls (e.g., actuators or other devices that control gas flow, steering, braking) to control the motion of the vehicle 300. The various vehicle controls 307 may include one or more controllers, control devices, motors, and/or processors.

The vehicle controls 307 may include a brake control module 320. The brake control module 320 is configured to receive a braking command and bring about a response by applying (or not applying) the vehicle brakes. In some examples, the brake control module 320 includes a primary system and a secondary system. The primary system receives braking commands and, in response, brakes the vehicle 300. The secondary system may be configured to determine a failure of the primary system to brake the vehicle 300 in response to receiving the braking command.

A steering control system 332 is configured to receive a steering command and bring about a response in the steering mechanism of the vehicle 300. The steering command is provided to a steering system to provide a steering input to steer the vehicle 300.

A lighting/auxiliary control module 336 receives a lighting or auxiliary command. In response, the lighting/auxiliary control module 336 controls a lighting and/or auxiliary system of the vehicle 300. Controlling a lighting system may include, for example, turning on, turning off, or otherwise modulating headlines, parking lights, running lights, and so forth. Controlling an auxiliary system may include, for example, modulating windshield wipers, a defroster, and so forth.

A throttle control system 334 is configured to receive a throttle command and bring about a response in the engine speed or other throttle mechanism of the vehicle. For example, the throttle control system 334 may instruct an engine and/or engine controller or other propulsion system component to control the engine or other propulsion system of the vehicle 300 to accelerate, decelerate, or remain at its current speed.

Each of the perception system 303, the prediction system 304, the motion planning system 305, the commander system 311, the navigator system 313, and the localizer system 330 may be included in or otherwise a part of a vehicle autonomy system 302 configured to control the vehicle 300 based at least in part on data obtained from one or more sensors 301. For example, data obtained by one or more sensors 301 may be analyzed by each of the perception system 303, the prediction system 304, and the motion planning system 305 in a consecutive fashion in order to control the vehicle 300. While FIG. 3 depicts elements suitable for use in a vehicle autonomy system according to example aspects of the present disclosure, one of ordinary skill in the art will recognize that other vehicle autonomy systems may be configured to control an autonomous vehicle based on sensor data.

The vehicle autonomy system 302 includes one or more computing devices, which may implement all or parts of the perception system 303, the prediction system 304, the motion planning system 305, and/or the localizer system 330.

Figure 4:
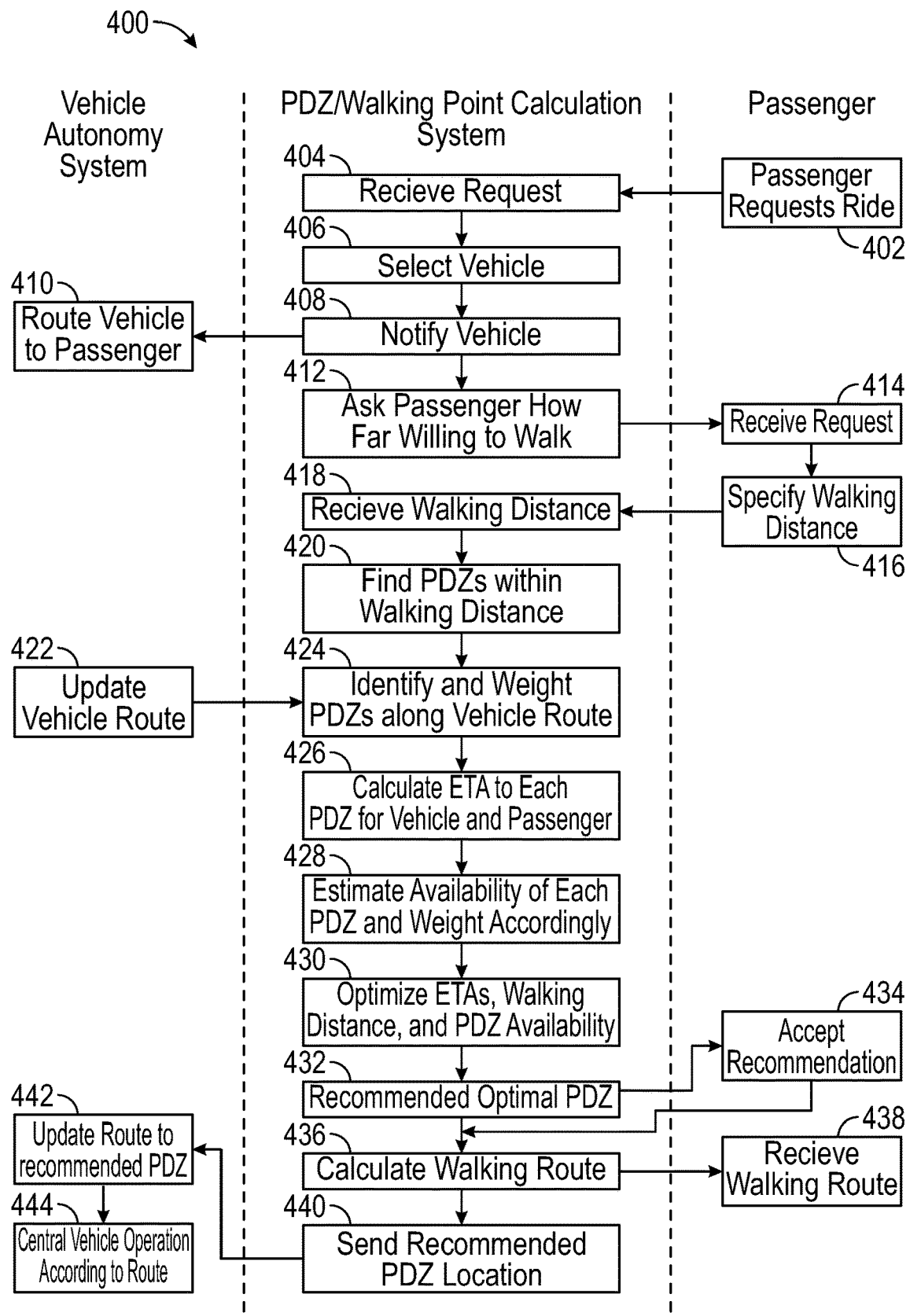
FIG. 4 is an interaction diagram depicting exchanges between a PDZ/Walking Point Calculation system, a vehicle autonomy system, and a passenger in performing a method of vehicle routing based on passenger walking points and optionally based on PDZ availability, according to some embodiments.

FIG. 4 is an interaction diagram depicting exchanges between a PDZ/Walking Point Calculation system 106, a vehicular autonomy system 104, and a passenger 108 in performing a method of vehicle routing based on passenger walking points and optionally based on PDZ availability, according to some embodiments. As shown in FIG. 4, the method 400 begins at operation 402, where the passenger 108 uses a passenger service to request a vehicle to pick up the passenger at a pickup location 202 requested by the passenger (FIG. 2) or the GPS coordinates of the passenger 108 as a target location. The PDZ/Walking Point Calculation system 106 receives the request at 404 and selects a vehicle using conventional vehicle selection techniques at 406 (e.g., based on vehicle location and availability). The dispatch system also generates routes for one or more vehicles at the same time, including the selected vehicle. The selected vehicle may be notified at 408 so that the vehicle may route itself to the target location at 410. The PDZ/Walking Point Calculation system 106 may also ask the passenger at 412 how far the passenger is willing to walk to a PDZ 114. The communication device of the passenger 108 receives the request at 414 and responds with the walking distance data at 416 that provides a maximum walking distance that the passenger 108 is willing or capable to walk to a PDZ 114. Alternatively, the passenger 108 may designate the walking distance when making the vehicle request at 402 or the acceptable walking distance may be pre-stored for the passenger 108 and provided with other passenger preference data for the calculations. For example, if the passenger 108 is elderly or disabled, it would become important to designate at the time of the request 402 that walking a significant distance to a PDZ 114 is not an option.

The PDZ/Walking Point Calculation system 106 receives the walking distance data at 418 and uses the GPS coordinates of passenger 108 and/or the GPS coordinates of the pickup location 202 requested by the passenger at 420 to find PDZs within the specified maximum walking distance of the passenger and/or the requested pickup location. In sample embodiments, the calculation of the walking distance and walking ETA will take into account the availability of cross-walks, where the passenger is willing to walk (e.g., at night or in the rain), etc. It will be appreciated that if no PDZ is located within the specified maximum walking distance that the PDZ/Walking Point Calculation system 106 may prompt the user to expand the specified maximum walking distance, select another vehicle, or select another service. Optionally, at 422 the vehicle may provide updated route data to the PDZ/Walking Point Calculation system 106 so that the PDZ/Walking Point Calculation system 106 may identify and weight any PDZs 114 along the vehicle route at 424. For example, PDZs 114 along the vehicle route would be weighted more heavily, while those PDZs 114 that are simple extensions of the route would be weighted less heavily, and PDZs 114 that are difficult to get to from the current vehicle location (e.g., due to one-way streets) are weighted even less. The PDZ/Walking Point Calculation system 106 would further calculate the ETA of the selected vehicle by a driving route and the passenger 108 by a walking route to each prospective PDZ 114 at 426. At 428, the PDZ/Walking Point Calculation system 106 may further estimate the availability of each PDZ using, for example, the afore-mentioned PDZ availability estimation system and weight each PDZ 114 accordingly.

At 430, the PDZ/Walking Point Calculation system 106 may optimize the ETAs for each prospective PDZ, the passenger walking distance, and the weightings of the PDZs based on placement along the vehicle route and/or probable availability to select a recommended PDZ. Such optimization algorithms include variations of Dijkstra's algorithm that are well-known in the art and thus will not be elaborated upon here. The optimizations may be weighted in numerous ways. Generally, the optimizations may be designed to maximize the convenience of the passenger by minimizing walking distances and wait times.

The recommended PDZ 114 is returned to the passenger 108 at 432. If the passenger accepts the recommendation at 434, the PDZ/Walking Point Calculation system 106 calculates the walking route to the recommended PDZ at 436 and provides the walking route to the passenger 108 at 438. It is noted that since the PDZ/Walking Point Calculation system 106 optimizes to minimize the ETA to the PDZ 114 for the vehicle and for the user at 430, the walking route may have already been calculated and thus may be used at 436. For example, a mobile device of the passenger 108 may be provided with a graphical user interface (GUI) that displays a map of a walking route from the current location of the passenger 108 and/or from the pickup location 202 requested by the passenger to the recommended PDZ 114 to which the vehicle autonomy system 104 is routed. Alternatively, the PDZ/Walking Point Calculation system 106 may wait until the vehicle 300 has found an open PDZ and then tell the person to start walking toward the PDZ or else instruct the passenger 108 to go to a walking point or a waiting/staging area until the vehicle 300 has found an open PDZ. The walking point or waiting/staging area may be identified using the recommendation techniques described herein.

At 440, the PDZ/Walking Point Calculation system 106 may further generate a route (or route extension) from the vehicle's current location to the recommended PDZ 114 or, conversely, may simply provide the GPS coordinates of the recommended PDZ 114 to the vehicle autonomy system 104 for on-vehicle route calculation. The vehicle autonomy system 104 may then generate the route to the recommended PDZ at 442 and control the vehicle operation according to the route at 444. That is, the vehicle autonomy system 104 controls operations of the vehicle such that the vehicle travels along the generated route (e.g., to the recommended PDZ).

It will be appreciated that, in sample embodiments, many or all of the operations performed by the PDZ/Walking Point Calculation system 106 may be performed by the vehicle autonomy system 104 and vice-versa. However, a typical embodiment would include a dispatch system that performs the operations of the PDZ/Walking Point Calculation system 106 and that manages a vehicle fleet.

Figure 5:
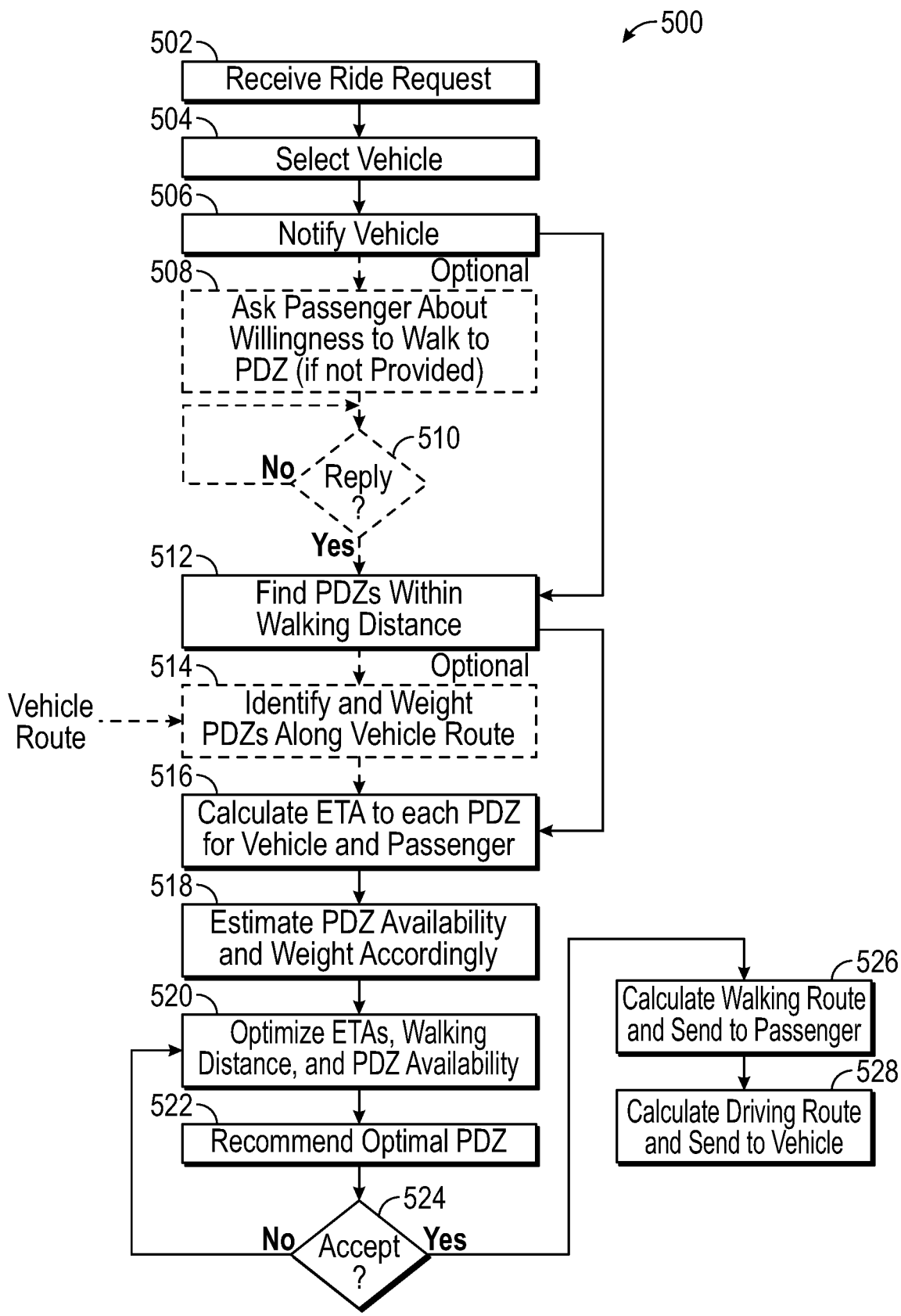
FIG. 5 is a flowchart illustrating example operations of the PDZ/Walking Point Calculation system in performing a method for providing recommended PDZs for picking up passengers in sample embodiments.

FIG. 5 is a flowchart illustrating example operations of the PDZ/Walking Point Calculation system 106 in performing a method 500 for providing recommended PDZs for picking up passengers in sample embodiments. The method 500 may be embodied in computer-readable instructions for execution by a hardware component (e.g., a processor) such that the operations of the method 500 may be performed by the PDZ/Walking Point Calculation system 106. Accordingly, the method 500 is described below, by way of example with reference thereto. However, it shall be appreciated that the method 500 may be deployed on various other hardware configurations, including the vehicle autonomy stack of the vehicle autonomy system 104, and is not intended to be limited to deployment on the PDZ/Walking Point Calculation system 106.

As shown in FIG. 5, the method 500 begins at operation 502, where the PDZ/Walking Point Calculation system 106 receives a ride request from the passenger's mobile device. The request includes a pickup location 202 requested by the passenger (FIG. 2) or the GPS coordinates of the passenger 108 as a target location. Optionally, the request also includes additional passenger data such as an indication of the distance the passenger is willing to walk to be picked up (which may vary according to weather conditions, the passenger's physical condition, and the like). Also, in alternative embodiments, the passenger may be incented to walk further to a PDZ in return for a discount fare for the trip. In such cases, the passenger 108 may select the walking distance based on the offered fare reductions. The PDZ/Walking Point Calculation system 106 selects a vehicle using conventional vehicle selection techniques at 504 (e.g., based on vehicle location and availability) and notifies the vehicle at 506.

Optionally, the PDZ/Walking Point Calculation system 106 may ask the passenger at 508 how far the passenger is willing to walk to a PDZ 114, and the PDZ/Walking Point Calculation system 106 may wait for a reply from the passenger at 510. Once a reply from the passenger is received at 510, or if the passenger walking distance data was included in the original request, the PDZ/Walking Point Calculation system 106 uses the GPS coordinates of passenger 108 and/or the GPS coordinates of the pickup location 202 requested by the passenger at 512 to find PDZs within the specified maximum walking distance of the passenger 108 and/or the pickup location 202 requested by the passenger. Optionally, at 514 the PDZ/Walking Point Calculation system 106 may receive updated route data from the vehicle and may identify and weight any PDZs 114 along the vehicle route. For example, PDZs 114 along the vehicle route would be weighted more heavily, while those PDZs 114 that are simple extensions of the route would be weighted less heavily, and PDZs 114 that are difficult to get to from the current vehicle location (e.g., due to one-way streets) are weighted even less. The PDZ/Walking Point Calculation system 106 would further calculate the ETA of the selected vehicle by a driving route and the passenger 108 by a walking route to each prospective PDZ 114 at 516. At 518, the PDZ/Walking Point Calculation system 106 may further estimate the availability of each PDZ using, for example, the afore-mentioned PDZ availability estimation system and weight each PDZ 114 accordingly.

At 520, the PDZ/Walking Point Calculation system 106 may optimize the ETAs for each prospective PDZ, the passenger walking distance, and the weightings of the PDZs based on placement along the vehicle route and/or probable availability to select a recommended PDZ. Such optimization algorithms are well-known in the art and will not be elaborated upon here. The recommended PDZ 114 provided to the passenger 108 at 522 and the PDZ/Walking Point Calculation system 106 awaits acceptance of the recommended PDZ 114 at 524. Once the passenger accepts the recommendation, the PDZ/Walking Point Calculation system 106 calculates the walking route to the recommended PDZ (or simply provides the GPS coordinates of the recommended PDZ to the passenger's mobile device for calculation of the walking route) and provides the walking route to the passenger 108 at 526. At 528, the PDZ/Walking Point Calculation system 106 may further generate a route (or route extension) from the vehicle's current location to the recommended PDZ 114 or, conversely, may simply provide the GPS coordinates of the recommended PDZ 114 to the vehicle autonomy system 104 for on-vehicle route calculation.

Those skilled in the art will appreciate that the systems and methods described herein may enable other possible optimizations. For example, a passenger may be incented to walk farther to a PDZ for a lower fare. Alternatively, the dispatching system may offer to pick up the passenger with minimal walking for an extra fee. Moreover, it will be appreciated that different dispatch systems may have different PDZs in a given area, so the optimization may take into account only the PDZs for a given dispatch system or the PDZs for a plurality of dispatch systems. Also, vehicle driving times and routes may vary on a fleet basis due to different system constraints. The systems and methods described herein may be adapted to account for such differences.

Figure 6:
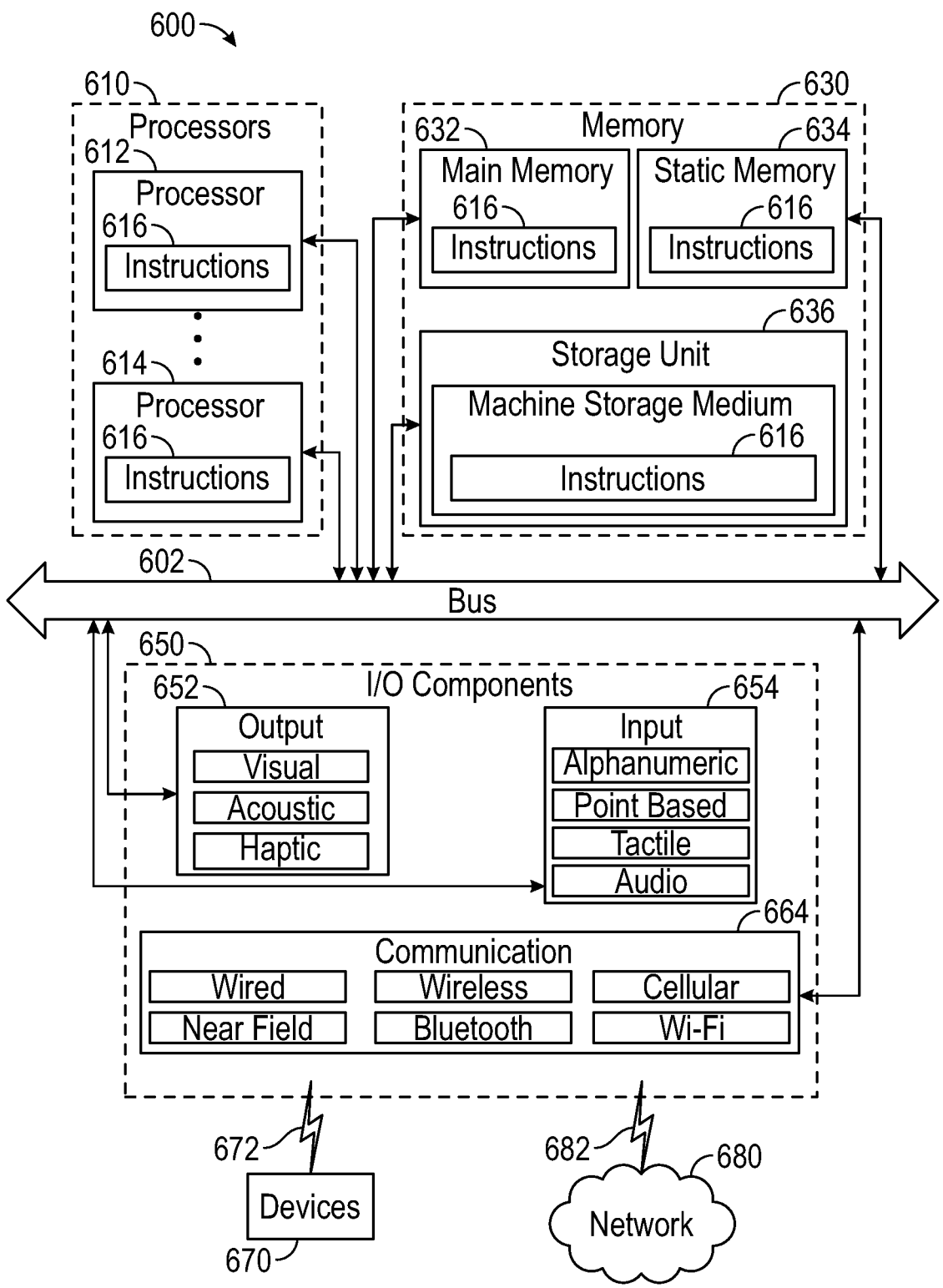
FIG. 6 is a diagrammatic representation of a machine in the example form of a computer system within which a set of instructions for causing the machine to perform any one or more of the methodologies discussed herein may be executed.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method 500. In this way, the instructions 616 transform a general, non-programmed machine into a particular machine 600, such as the PDZ/Walking Point Calculation system 106, that is specially configured to carry out the described and illustrated functions in the manner described above. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and input/output (I/O) components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include components to receive input, provide output, produce output, transmit information, exchange information, capture measurements, and so on. The specific I/O components 650 that are included in a particular machine 600 will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components to provide communication via other modalities. The devices 670 may be another machine or any of a wide variety of peripheral devices (e.g., a peripheral device coupled via a universal serial bus (USB)).

Executable Instructions and Machine Storage Medium

The various memories (e.g., 630, 632, 634, and/or memory of the processor(s) 610) and/or the storage unit 636 may store one or more sets of instructions 616 and data structures (e.g., software) embodying or utilized by any one or more of the methodologies or functions described herein.

These instructions, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. An autonomous vehicles management system, comprising:
    at least one processor programmed to perform operations comprising:
        receiving a request for a passenger at a target location;
        accessing maximum walking distance data associated with the passenger, the maximum walking distance data indicating a maximum walking distance for the passenger;
        identifying a plurality of vehicle stopping locations that are less than the maximum walking distance from the target location;
        determining an estimated time-of-arrival of a first autonomous vehicle to a first vehicle stopping location of the plurality of vehicle stopping locations;
        determining an estimated time-of-arrival of the passenger to the first vehicle stopping location;
        estimating a likelihood that the first vehicle stopping location will have space for the first autonomous vehicle to stop upon arrival of the first autonomous vehicle at the first vehicle stopping location;
        selecting a vehicle stopping location from the plurality of vehicle stopping locations, the selecting based at least in part on a walking distance of the passenger to the first vehicle stopping location, the estimated time of arrival of the first autonomous vehicle to the first vehicle stopping location, the estimated time of arrival of the passenger to the first vehicle stopping location, and the likelihood that the first vehicle stopping location will have space for the first autonomous vehicle to stop upon arrival of the first autonomous vehicle at the first vehicle stopping location; and
        sending an indication of the selected vehicle stopping location to the first autonomous vehicle.

2. The system of claim 1, the operations further comprising identifying at least one vehicle stopping location of the plurality of vehicle stopping locations that is along a driving route of the first autonomous vehicle to the target location, the selecting of the selected vehicle stopping location also being based at least in part on the at least one vehicle stopping location that is along the driving route of the first autonomous vehicle.

3. The system of claim 1, wherein the request comprises pickup location data describing a pickup location for the passenger.

4. The system of claim 1, wherein the request comprises GPS data describing GPS coordinates of the passenger at the target location.

5. The system of claim 1, the operations further comprising:
    sending a maximum walking data request to the passenger soliciting the maximum walking distance for the passenger; and
    receiving a response from the passenger including the maximum walking distance data.

6. The system of claim 1, the operations further comprising:
    sending a maximum walking data request to the passenger soliciting the maximum walking distance for the passenger, the maximum walking data request indicating a first price associated with a first maximum walking distance and a second price associated with a second maximum walking distance; and
    receiving a response from the passenger including the maximum walking distance data.

7. The system of claim 1, the operations further comprising sending walking route data to the passenger, the walking route data describing a walking route to the selected vehicle stopping location.

8. The system of claim 1, the operations further comprising:
    determining an updated driving route to the selected vehicle stopping location for the first autonomous vehicle; and
    sending updated driving route data describing the updated driving route to the first autonomous vehicle.

9. The system of claim 1, the operations further comprising:
    sending, to the first autonomous vehicle, a set of instructions that, when received by an autonomy system of the first autonomous vehicle, cause the autonomy system to control operation of the first autonomous vehicle to navigate to the selected vehicle stopping location.

10. A method for managing autonomous vehicles, the method comprising:
    receiving, by at least one processor, a request for a passenger at a target location;
    accessing, by the at least one processor, maximum walking distance data associated with the passenger, the maximum walking distance data indicating a maximum walking distance for the passenger;
    identifying, by the at least one processor, a plurality of vehicle stopping locations that are less than the maximum walking distance from the target location;
    determining, by the at least one processor, an estimated time-of-arrival of a first autonomous vehicle to a first vehicle stopping location of the plurality of vehicle stopping locations;
    determining, by the at least one processor, an estimated time-of-arrival of the passenger to the first vehicle stopping location;
    estimating, by the at least one processor, a likelihood that the first vehicle stopping location will have space for the first autonomous vehicle to stop upon arrival of the first autonomous vehicle at the first vehicle stopping location;
    selecting, by the at least one processor, a vehicle stopping location from the plurality of vehicle stopping locations, the selecting based at least in part on a walking distance of the passenger to the first vehicle stopping location, the estimated time-of-arrival of the first autonomous vehicle to the first vehicle stopping location, the estimated time-of-arrival of the passenger to the first vehicle stopping location, and the likelihood that the first vehicle stopping location will have space for the first autonomous vehicle to stop upon arrival of the first autonomous vehicle at the first vehicle stopping location; and sending, by the at least one processor, an indication of the selected vehicle stopping location to the first autonomous vehicle.

11. The method of claim 10, further comprising identifying at least one vehicle stopping location of the plurality of vehicle stopping locations that is along a driving route of the first autonomous vehicle to the target location, the selecting of the selected vehicle stopping location also being based at least in part on the at least one vehicle stopping location that is along the driving route of the first autonomous vehicle.

12. The method of claim 10, wherein the request comprises pickup location data describing a pickup location for the passenger.

13. The method of claim 10, wherein the request comprises GPS data describing GPS coordinates of the passenger at the target location.

14. The method of claim 10, further comprising:
sending a maximum walking data request to the passenger soliciting the maximum walking distance for the passenger; and
receiving a response from the passenger including the maximum walking distance data.

15. The method of claim 10, further comprising:
sending a maximum walking data request to the passenger soliciting the maximum walking distance for the passenger, the maximum walking data request indicating a first price associated with a first maximum walking distance and a second price associated with a second maximum walking distance; and
receiving a response from the passenger including the maximum walking distance data.

16. The method of claim 10, further comprising sending walking route data to the passenger, the walking route data describing a walking route to the selected vehicle stopping location.

17. The method of claim 10, further comprising:
determining an updated driving route to the selected vehicle stopping location for the first autonomous vehicle; and
sending updated driving route data describing the updated driving route to the first autonomous vehicle.

18. The method of claim 10, further comprising:
sending, to the first autonomous vehicle, a set of instructions that, when received by an autonomy system of the first autonomous vehicle, cause the autonomy system to control operation of the first autonomous vehicle to navigate to the selected vehicle stopping location.

19. A non-transitory computer-readable medium comprising instructions thereon that, when executed by at least one processor, cause the at least one processor to perform operations comprising:
receiving a request for a passenger at a target location;
accessing maximum walking distance data associated with the passenger, the maximum walking distance data indicating a maximum walking distance for the passenger;
identifying a plurality of vehicle stopping locations that are less than the walking distance from the target location;
determining an estimated time-of-arrival of a first autonomous vehicle to a first vehicle stopping location of the plurality of vehicle stopping locations;
determining an estimated time-of-arrival of the passenger to the first vehicle stopping location;
estimating a likelihood that the first vehicle stopping location will have space for the first autonomous vehicle to stop upon arrival of the first autonomous vehicle at the first vehicle stopping location;
selecting a vehicle stopping location from the plurality of vehicle stopping locations, the selecting based at least in part on a walking distance of the passenger to the first vehicle stopping location, the estimated time-of-arrival of the first autonomous vehicle to the first vehicle stopping location, the estimated time-of-arrival of the passenger to the first vehicle stopping location, and the likelihood that the first vehicle stopping location will have space for the first autonomous vehicle to stop upon arrival of the first autonomous vehicle at the first vehicle stopping location; and
sending an indication of the selected vehicle stopping location to the first autonomous vehicle.

20. The non-transitory computer-readable medium of claim 19, the operations further comprising identifying at least one vehicle stopping location of the plurality of vehicle stopping locations that is along a driving route of the first autonomous vehicle to the target location, the selecting of the selected vehicle stopping location also being based at least in part on the at least one vehicle stopping location that is along the driving route of the first autonomous vehicle.

\* \* \* \* \*